Patented July 31, 1928.

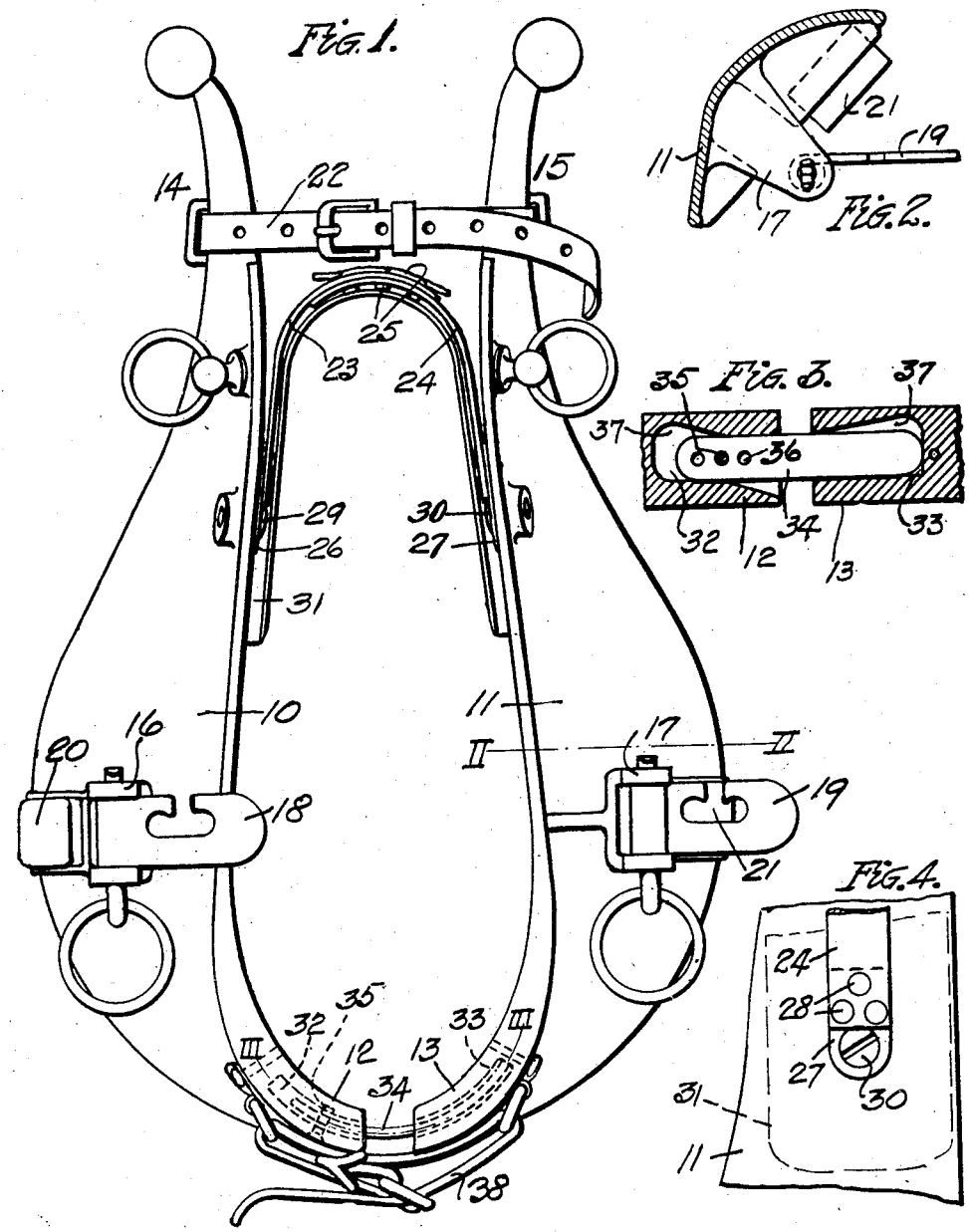

1,678,782

UNITED STATES PATENT OFFICE.

JOHN D. McMURRY, OF MEMPHIS, TENNESSEE.

COMBINATION COLLAR AND HAME.

Application filed July 25, 1927. Serial No. 208,202.

This invention relates to a combined collar and hame in which the draft pull is transferred to the collar and at the same time rotation of the collar is prevented and clamping or pinching on the neck of the animal is avoided.

It further relates to means for adjusting both the width and length of the collar to adjust the same to varying size necks and to means for supporting the collar from the neck of the animal in such manner that the movement of the collar caused by the movement of the shoulders of the animal will not be transferred through the support to the animal's neck.

The objects of this invention, are:

(a) To make a rigid collar conforming substantially to the shape of the animal's shoulder.

(b) To provide means for limiting the relative rotation of the two halves of the collar about a vertical axis.

(c) To provide means for adjusting the width of the throat portion of the collar.

(d) To provide means for adjusting the width of the neck portion of the collar.

(e) To provide means for adjusting the height of the collar.

(f) To provide means for allowing movement of the neck support for the collar independent of the movement of the shoulder or draft portion thereof, and (g) To generally improve the construction and arrangement of a combined collar and hame.

The means by which these and other objects are accomplished, and the manner of their accomplishment, will readily be understood from the attached specification on reference to the accompanying drawings, in which:—

Fig. 1 is a front elevation of the preferred form of my collar and hame.

Fig. 2 is a sectional plan taken on the line II—II of Fig. 1, showing typical cross section of a collar half and trace tug hook.

Fig. 3 is a section on the line III—III of Fig. 1 showing the bar by which rotation around a vertical axis is prevented; and Fig. 4 is a fragmentary detail showing the means by which the collar support is attached.

Referring now to the drawings in which the various parts are indicated by numerals, the collar comprises similar oppositely disposed halves 10 and 11 the general cross section of which is indicated in Fig. 2. These halves are each made up preferably of a thin, transversely curved metal section as indicated in that figure with a thickened lower end, 12, 13 respectively, and having integral horns 14 and 15 extending upward from the top thereof. 16 and 17 are brackets which carry the trace tug-hooks 18 and 19 respectively. 20 and 21 are rubber bumpers or pads against which the tug-hooks rest when under strain. 22 is the hame strap which passes around the horns 14 and 15, forming the top fastening for the collar halves. 23 and 24 are the collar supporting straps which over-lap and are secured together by the lace, or thong, 25. The lower ends of these leathers are secured respectively to the flat metal plates 26, 27, by rivets 28 and these metal plates in turn are pivotally secured to the collar halves by screws 29, 30, on which they respectively turn. 31 is a leather collar pad covering these supporting members.

The lower end of each of the collar halves is cored out in the form of arcuate slots 32, 33, respectively, in which slots, a similarly curved bar 34 is disposed. One end of this bar is secured in the slot 32 by means of a screw 35, which as will be seen on reference to Fig. 3, it loosely embraces. The other end of the bar 34 slides loosely in the slot 33. If desired, additional holes 36 may be provided through which the screw 35 may be passed, thus providing a means for adjusting the distance of the collar ends apart.

The slots 32, 33 may be enlarged as at 37 to provide a forward swing of the collar halves from the shoulders.

It will also be noted that the bar 34 as shown in Fig. 3, is narrower than the slots 32, 33, so that a limited amount of play is allowed between the collar ends 12, 13 and the corresponding ends of the bar. 38 is the lower hame strap.

In use the collar is unfastened at the lower end and put over the animal's neck in the usual manner. The supporting straps are then adjusted by loosening the lace 25 and replacing same to adjust the collar to the proper position on the animal's neck. The upper hame string may then be tightened or loosened as the case may be, and the lower hame string be similarly adjusted until the collar fits as snugly as may be desired. Before tightening the lower hame string, the screw 35 is placed in the proper hole 36, to provide necessary distance apart of the halves.

It will be seen that when a pull is put on the tug hooks, they will attempt to turn the collar halves about a vertical axis, and that this will be effectually prevented by the binding of the bar 34 in the slots 32, 33 respectively, and thus pinching of the neck will be prevented.

It will also be noted that as the sides of the collar alternately move forward with the movement of the animal's shoulders, the pivoted neck support will carry the weight of the upper portion of the collar without twisting or movement on the neck, and that the lower portion of the halves only acts as a collar, with the supporting strap acting as the upper collar portion, while the upper portions of the halves bear away from the straps and perform the usual function of the hames.

It will of course be understood that various modifications may be made in the details of construction and that the drawings are therefore illustrative only. It will further be understood that I do not wish to confine myself to the specific details herein shown, except as same may be hereinafter specifically set out in the claims.

Having thus disclosed the invention, what I claim is:—

1. In a combination collar and hame, two oppositely disposed halves of rigid material, each having the lower portion shaped to conform to an animal's neck and shoulder, top and bottom draft fastenings for the said halves, and a support comprising oppositely disposed flexible bands of substantial width, means joining said bands at the top, a metal plate attached to each of the said bands and a pivot extending through each of the said plates to attach the same to one of said halves.

2. In a combination collar and hame, two oppositely disposed halves of rigid material, each having the lower portion shaped to conform to an animal's neck and shoulder, top and bottom draft fastenings for the said halves, and a support comprising a band of substantial width, and a pivot extending through each of the ends of said band to attach same to one of said halves.

3. In a combination collar and hame, two oppositely disposed halves of rigid material, each having the lower portion shaped to conform to an animal's neck and shoulder and the upper portion bearing away therefrom, top and bottom draft fastenings for the said halves, and a support comprising a band of substantial width extending downward to the point of divergence, and a reinforcing plate attached to each of the ends of said band, and a pivot extending through each of the said plates to attach same to one of said halves.

4. In a combination collar and hame, two oppositely disposed formed halves of rigid material, having their lower ends cored out to provide pockets therein, a supporting member joined to said halves, a top fastening, a bottom fastening and means for holding the bottoms of said halves apart and preventing rearward rotation thereof about a vertical axis, comprising a bar of cross section complementary to the cross section of the said pockets, having one of its ends disposed in and bottoming in one of said pockets, and having its opposite end disposed in the other of said pockets and adjustably secured with relation thereto.

5. In a combination collar and hame, two oppositely disposed formed halves of rigid material, having their lower ends cored out to provide curved pockets, a supporting member pivotally attached to said halves, a top fastening, a bottom fastening, and means for holding the bottoms of said halves apart comprising a curved bar conforming to said curved pockets, said bar having a plurality of holes near one end thereof, a removable pin in the lower end of one of said collar halves adapted to be passed through anyone of the holes in said bar whereby said bar may be secured in desired position in a pocket, and the other end of said bar be allowed to bottom in the opposite pocket to position said collar halves apart.

6. In a combination collar and hame, two oppositely disposed formed halves of rigid material, each of said halves having their lower ends cored out to provide curved pockets of rectangular cross section, and a bottom fastening comprising a curved bar of complementary cross section disposed in said pockets, a pin securing one end of said bar to one of said halves within said pockets, and a flexible member securing the lower end of said halves against separation.

In testimony whereof I have hereunto set my name.

JOHN D. McMURRY.